United States Patent [19]
Pogue et al.

[11] Patent Number: 6,112,240
[45] Date of Patent: Aug. 29, 2000

[54] WEB SITE CLIENT INFORMATION TRACKER

[75] Inventors: Michael Alan Pogue; Laura Allison Werner, both of Sunnyvale; Ralf I. Pfeiffer, Cupertino; Pratima Gupta, Sunnyvale; Yong Zhang, Fremont; James Andrew Clark, Cupertino, all of Calif.

[73] Assignee: International Business Machines Corporation, Armonk, N.Y.

[21] Appl. No.: 08/923,013

[22] Filed: Sep. 3, 1997

[51] Int. Cl.[7] ............................ G06F 13/14; G06F 15/16; G06F 3/00
[52] U.S. Cl. ......................... 709/224; 707/513; 709/219; 709/202; 709/203
[58] Field of Search ................................. 707/1, 10, 513, 707/501; 395/200.33, 200.57, 200.32; 709/203, 202, 227, 300, 224, 219

[56] References Cited

U.S. PATENT DOCUMENTS

| | | | |
|---|---|---|---|
| 5,623,656 | 4/1997 | Lyons | 707/10 |
| 5,712,979 | 1/1998 | Graber et al. | 709/224 |
| 5,717,860 | 2/1998 | Graber et al. | 709/227 |
| 5,721,908 | 2/1998 | Lagarde et al. | 707/10 |
| 5,742,762 | 4/1998 | Scholl et al. | 709/223 |
| 5,751,956 | 5/1998 | Kirsch | 709/203 |
| 5,774,670 | 6/1998 | Montulli | 709/227 |
| 5,793,966 | 8/1998 | Amstein et al. | 709/203 |
| 5,796,952 | 8/1998 | Davis et al. | 709/224 |
| 5,812,769 | 9/1998 | Graber et al. | 709/228 |
| 5,819,285 | 10/1998 | Damico et al. | 707/104 |

OTHER PUBLICATIONS

Lee, Lydia; "Beyond the Hits: Mining Web Sites for Traffic Data"; New Media Magazine, Nov. 1996.

Lee, Lydia; "Site Analysis Tools Get Serious"; New Media Magazine, Nov. 1996.

Pogue et al; "A Method for Improved Control of Web Browser Caching Behavior", 1997.

Pogue et al; "System for Tracking Website Usage", 1997.

Lemay, Laura; "Teach Yourself Java in 21 Days"; ISBN: 1–57521–030–4; Sams.net Publishing; Chapters 8 and 14, Dec. 1995.

Kruse, Matt; "Using Server–side includes"; Dr. Dobb's Journal; M&T Publishing; v21, n2, p52(3), Feb. 1996.

Staten, James; "Navigator tricks raise concerns"; MacWeek; Ziff–Davis Publishing; v10, n11, p18(2), Mar. 1996.

Stark, Thom; "Server Side Includes take hold"; LAN Times; Mc–Graw–Hill Inc.; v13, n5, p94(1), Mar. 1996.

Gellman, Robert; "They could be monitoring your every Web move"; Government Computer News; Cahners Publishing Assoc.; v15, n9, p25(1), Apr. 1996.

Linthicum, David S.; "Application development tackles the intranet"; Datamation; Cahners Publishing Assoc.; v42, n15, p113(4), Sep. 1996.

Lemay, Laura; "Teach Yourself Web Publishing with HTML 3.2 in a week", Third Edition; ISBN: 1–57521–192–0; Sams.net Publishing; pp. 439–442, Dec. 1996.

Mendelson, Edward; Java: Create your own applets; PC Magazine; Ziff–Davis Publishing Co.; v16, n11, p141(7), Jun. 1997.

*Primary Examiner*—Mark H. Rinehart
*Assistant Examiner*—Marc D. Thompson
*Attorney, Agent, or Firm*—Kudirka & Jobse, LLP

[57] ABSTRACT

A method and apparatus for obtaining client information relating to a web page in a World Wide Web site utilizes a tracker tag in the code of the web page for initiating a client information tracking program. The tracking program may be on a client computer that is accessing the web page, or a tracking computer that is remote from the client computer. The tracking program is initiated by a tracker message transmitted from a web browser on the client computer to the tracking program when the tracker tag is read by the web browser. In one embodiment, the tracking program first obtains the client information, and then stores the client information in the memory of a computer having the tracking program.

48 Claims, 7 Drawing Sheets

WEB SITE CLIENT INFORMATION TRACKER

FIELD OF THE INVENTION

This invention relates generally to World Wide Web sites and, more particularly, to a client information tracker for tracking information relating to client use of World Wide Web sites.

BACKGROUND OF THE INVENTION

Figure 1:
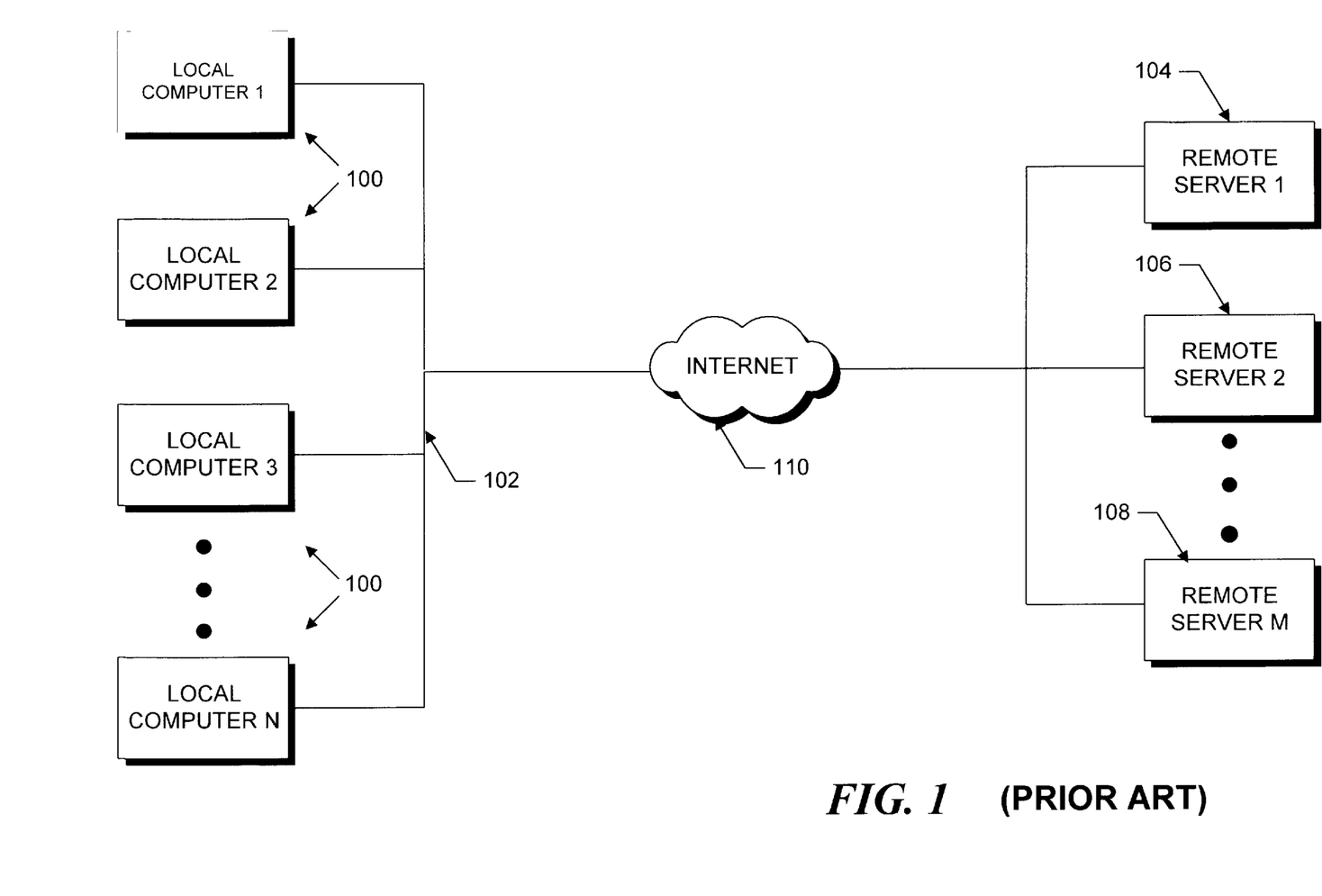
FIG. 1 is a block diagram of a commonly used network arrangement.

FIG. 1 shows a commonly used network arrangement in which a plurality of local computer systems (100) connected to a local area network (LAN 102) access a plurality of remote servers through the Internet 110. Each remote server may include World Wide Web sites (web sites) that each include a plurality of World Wide Web pages (web pages). Each local computer system 100 may access the remote web sites with web browser software, such as Netscape Navigator™, available from Netscape Communications Corporation of Mountain View, Calif.

The World Wide Web is a collection of servers (i.e., web servers) connected to the Internet that utilize the Hypertext Transfer Protocol (HTTP). HTTP is a known application protocol that provides users with access to files (which can be in different formats, such as text, graphics, images, sound, and video) using a standard page description language known as Hypertext Markup Language (HTML). HTML is used to transmit data and instructions between a remote computer (the web server) and a local computer (client computer) in a form that is understandable to the browser software on the client computer.

Information in web pages accessed over the Internet commonly is downloaded into a volatile cache memory in the client computer system. This enables a person visiting a site (visitor) to quickly re-access web page information that was already downloaded, thereby eliminating the need to repeat the relatively slow process of traversing the Internet to access previously viewed web pages. Browsers thus typically include a mechanism for re-accessing the downloaded web pages. The Netscape Navigator™ browser, for example, includes a "BACK" button and a "FORWARD" button on a graphical user interface for such purposes.

In addition to downloading the web page, the web server also may transmit a "cookie" to the browser and receive previously transmitted cookies stored in the permanent memory of the browser. As is well known in the art, a cookie may include information that facilitates access to the downloaded web page on a subsequent access by the browser. By way of example, such information may enable the client computer to more easily form the web page when it is subsequently displayed by a display device in the client computer system.

Information relating to visitor use of a web site is important in maintaining and supporting a web site. For example, use of a web page by a very small number of visitors might suggest that such web page should be eliminated or redesigned to attract more visitors. One known method of obtaining such information utilizes a counter that counts the number of times a web page has been accessed. The counter typically is in the form of an application program on the web server that may be accessed by a web server administrator. One problem with this method, however, is that it does not account for re-accesses to web pages after such web pages have been downloaded into the cache memory in the client computer. More particularly, this method does not count the number of times a visitor re-accesses the downloaded web page, such as by selecting a BACK button or FORWARD button displayed by the web browser. Such method therefore merely indicates the number of visitors to a web page and not the actual number of times such web page has been accessed. These two numbers can vary significantly, thus providing inaccurate information.

Accordingly, it would be desirable to have a method and apparatus that accurately and efficiently obtains and stores information relating to use of a web site.

SUMMARY OF THE INVENTION

In accordance with one aspect of the invention, a method and apparatus for obtaining client information relating to a web page in a World Wide Web site utilizes a tracker tag in the code of the web page for initiating a client information tracking program. The tracking program may be on a client computer that is accessing the web page, or a tracking computer that is remote from the client computer. The tracking program is initiated by a tracker message transmitted from a web browser on the client computer to the tracking program when the tracker tag is read by the web browser. In one embodiment, the tracking program first obtains the client information, and then stores the client information in the memory of a computer having the tracking program.

In accordance with another aspect of the invention, the apparatus for obtaining client information includes a mechanism for intercepting a request from the browser to display a previously downloaded web page on a client display device at the client computer. The invention further includes a mechanism for controlling the client computer to direct a second tracker message to the tracking program for notifying the tracking program that the web page is displayed on the client display device. The second message therefore notifies the tracker that the web page is being re-accessed by the client computer.

In yet another aspect of the invention, the tracker tag is a Java applet contained within the code of the web page. The applet executes responsively executes when the web page being formed for display, thus obtaining the client information. The client information then is directed to the tracking computer for the tracking program. Each time the downloaded web page is displayed by the client computer, the applet obtains further client information and again directs such information to the tracking computer.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF ILLUSTRATIVE EMBODIMENTS

Figure 2:
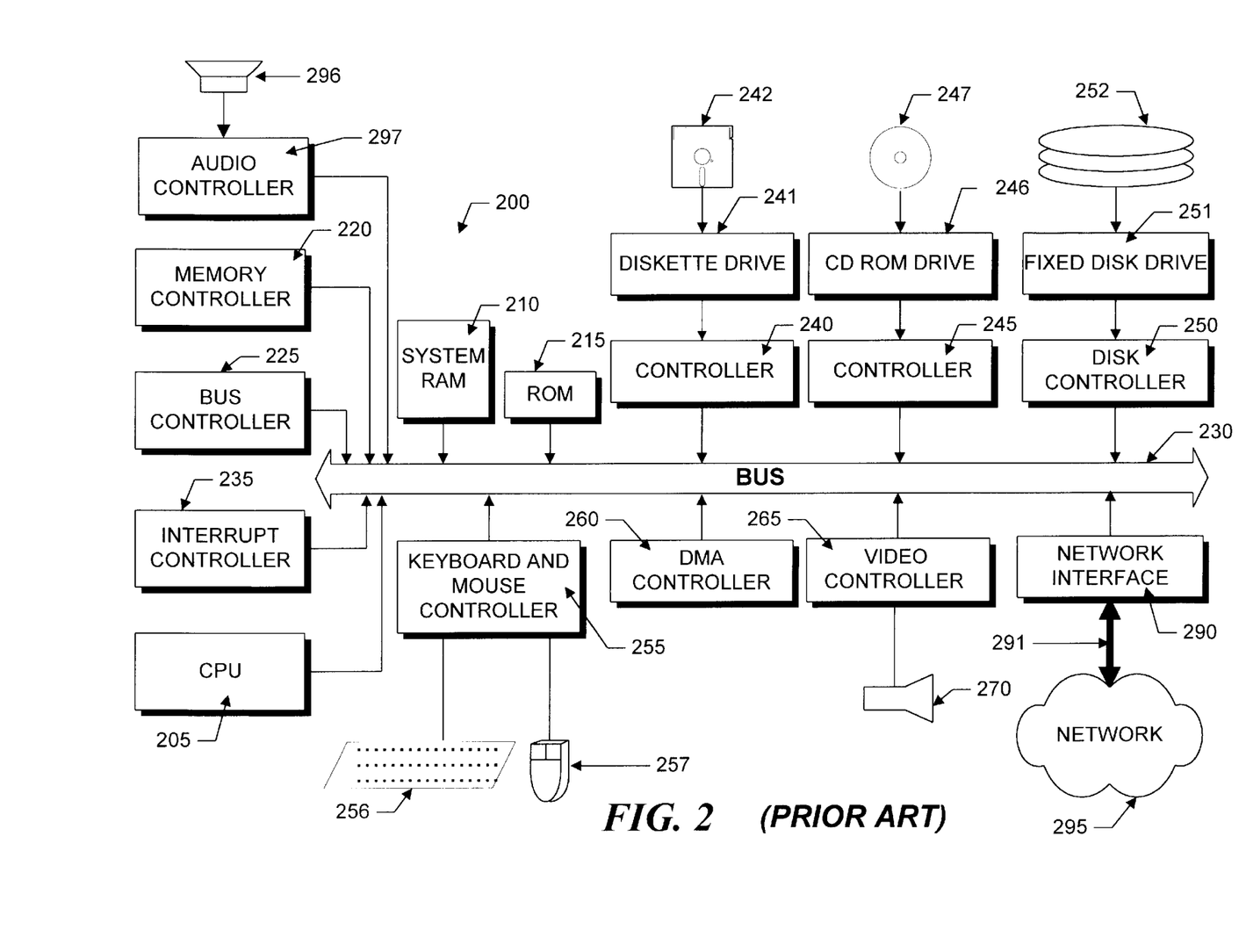
FIG. 2 is a schematic illustration of a computer architecture on which the invention may be implemented.

FIG. 2 illustrates the system architecture for an exemplary computer system 200, such as an IBM THINKPAD 701® computer, that can be utilized to access a World Wide Web page (web page) at a World Wide Web site (web site). Information relating to the client computer 200 and its access and use of the web page (i.e., client information) can be obtained and utilized by a system administrator of the web site. The exemplary computer system of FIG. 2 is discussed only for descriptive purposes, however, and should not be considered a limitation of the invention. Although the description below may refer to terms commonly used in describing particular computer systems, such as an IBM THINKPAD 701® computer, the described concepts apply equally to other computer systems, including systems having architectures that are dissimilar to that shown in FIG. 2.

The computer 200 includes a central processing unit (CPU) 205, which may include a conventional microprocessor, random access memory (RAM) 270 for temporary storage of information, and read only memory (ROM) 215 for permanent 210 storage of information. A bus controller 225 is provided for controlling bus 230, and an interrupt controller 235 is used for receiving and processing various interrupt signals from the other system components.

Mass storage may be provided by diskette 242, CD-ROM 247, or hard disk 252. Data and software may be exchanged with computer 200 via removable media, such as diskette 242 and CD-ROM 247. Diskette 242 is insertable into diskette drive 241, which is connected to bus 230 by controller 240. Similarly, CD-ROM 247 is insertable into CD-ROM drive 246, which is connected to bus 230 by controller 245. Finally, the hard disk 252 is part of a fixed disk drive 251, which is connected to bus 230 by controller 250.

User input to the computer 200 may be provided by a number of devices. For example, a keyboard 256 and a mouse 257 may be connected to bus 230 by keyboard and mouse controller 255. An audio transducer 296, which may act as both a microphone and a speaker, is connected to bus 230 by audio controller 297. It should be obvious to those reasonably skilled in the art that other input devices, such as a pen and/or tablet and a microphone for voice input, may be connected to computer 200 through bus 230 and an appropriate controller. DMA controller 260 is provided for performing direct memory access to system RAM 210. A visual display is generated by a video controller 265, which controls video display 270.

Computer system 200 generally is controlled and coordinated by operating system software, such as the WINDOWS 95® operating system (available from Microsoft Corp., Redmond, Wash.). Among other computer system control functions, the operating system controls allocation of system resources and performs tasks such as process scheduling, memory management, networking and I/O services.

Computer 200 also includes a network adapter 290 that allows the computer 200 to be interconnected to a network 295 via a bus 291. The network 295 may be a local area network (LAN), a wide area network (WAN), or the Internet.

Figure 3:
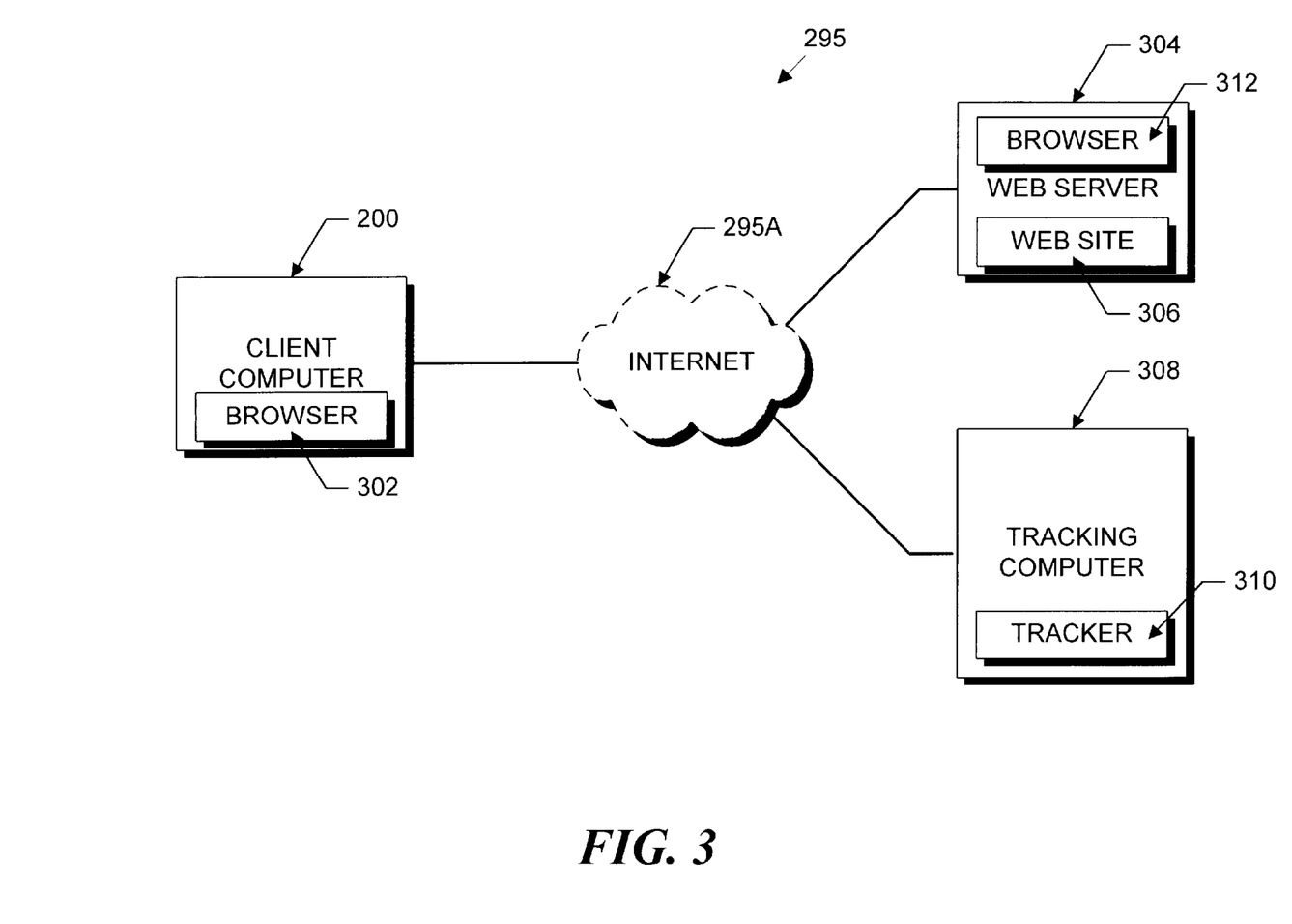
FIG. 3 is a block diagram of a network that may be utilized by the disclosed system.

FIG. 3 shows a network 295 that may be utilized by a preferred embodiment of the invention. The network 295 includes the client computer 200 having a web browser (browser 302), a web server 304 having a web site 306 that is accessible by the browser 302, and a tracking computer 308 having a tracking program (tracker 310) for obtaining client information relating to the web pages in a web site 306. The client computer 200, web server 304, and tracking computer 308 communicate through the Internet 295A. The browser 302 initiates access to the web site 306 by transmitting a browser request message to the web site 306. The browser request message includes a request to access the site, and a browser header that includes information relating to the browser 302 and client computer 200. This information may include the browser type and version, the type of client computer, and the operating system used by the client computer 200.

Figure 4:
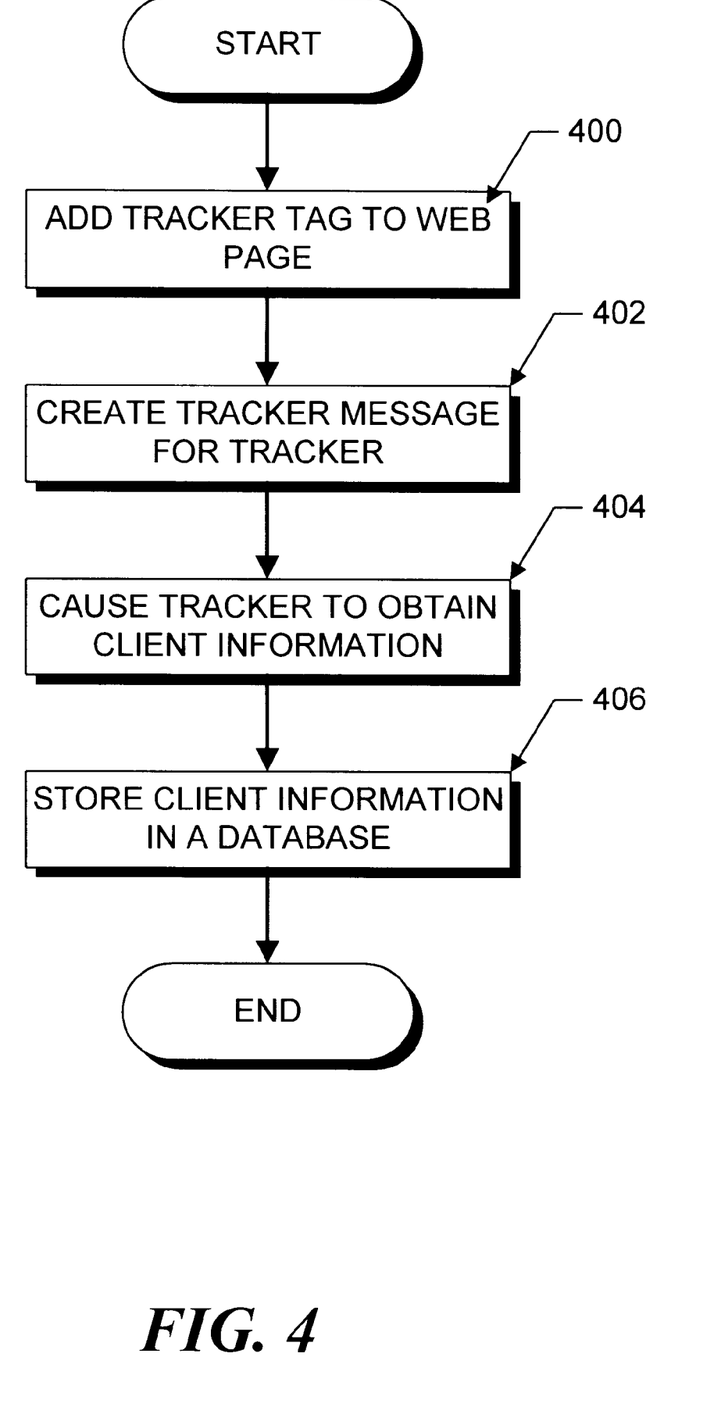
FIG. 4 is a flow chart generally summarizing the steps of obtaining and storing client information.

In the preferred embodiment of the invention, the process for gathering and storing client information on the tracker 310 is performed each time a web page from the web site 306 is displayed by the client computer 200. FIG. 4 is a flow chart illustrating a generalized process for gathering and storing the client information for a web page in a web site 306. The process begins at step 400 where a tracker tag is added to the HTML code of the web page. The tracker tag, which may be added either manually or by means of a conventional application program, is code written in a preselected form that typically produces a known HTML <IMG> tag within the HTML code of the web page. The preselected form may be any known form, such as Javascript, Java, or conventional HTML.

At step 402, the execution of the tracker tag by the browser 302 creates a tracker message when the web page is being formed for display by the client computer 200. The tracker message may be transmitted to the tracking computer 308 either immediately after the web page is displayed, or at a later time after the page is displayed. The tracker message may include client information (discussed below) and/or may be a call to the tracking computer 308 to execute the tracker 310. At step 404, the tracker 310 obtains the client information in accordance with any method that may facilitate information retrieval. The client information then is stored in a client information database on the tracking computer 308 (step 406). Details of three implementations of the process shown in FIG. 4 are discussed with reference to FIGS. 5–7.

An administrator of the web site 306 may access the client information database at any time to ascertain how the web page has been used. To that end, the tracking computer 308 may include a database retrieval program, such as a Java applet, that enables the client information to be remotely retrieved from the client information database. The administrator may access the Java applet via a Java enabled browser 312 on the web server 304. The retrieved client information then may be displayed on a display device (not shown) on the web server 304. The web page may be modified as needed based on the displayed client information. For example, if most visits to the web page are for an insignificant period of time, the administrator may modify the web page to include more sophisticated graphics, or to include information that is more useful for prospective web page users.

Figure 5:
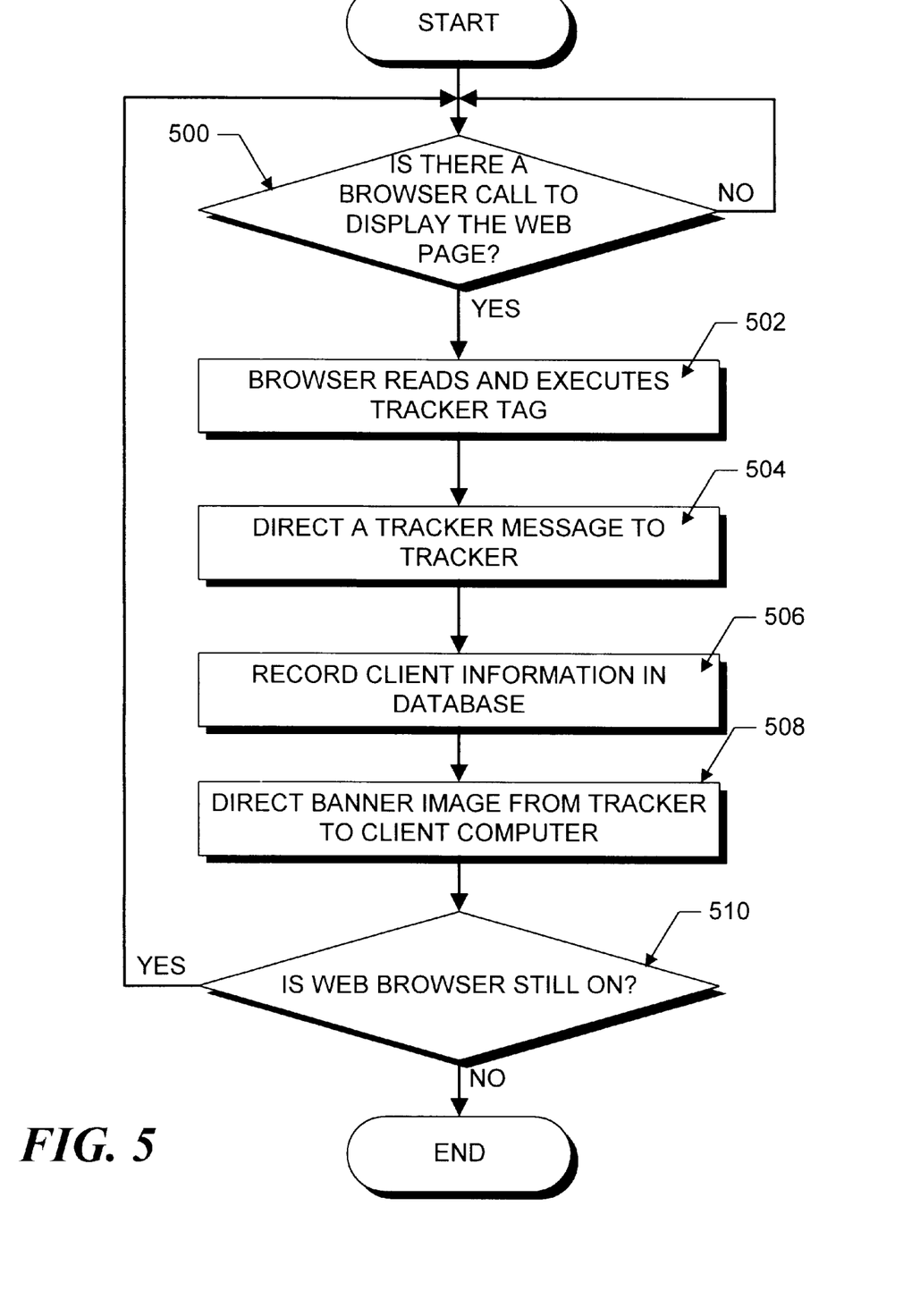
FIG. 5 is a flow chart summarizing the steps that may be used by a Javascript enabled browser for obtaining client information.

FIG. 5 is a flow chart showing a first implementation of the process shown in FIG. 4. In summary, this first implementation utilizes a tracker tag, written in Javascript (developed by Netscape Communications Corporation), to direct a tracker message from the client computer 200 to the tracker 310 each time the web page is formed for display by the display device on the client computer system 200. The flow chart in FIG. 5 shows the steps for obtaining client information for a web page that is downloaded onto the client computer. The process shown in FIG. 5 may be used by each browser 302 accessing the web site 306.

The first implementation begins at step 500 where a request to display the downloaded web page is detected. This may be done by intercepting browser requests on the client computer 200. The process continues to step 502 if such a browser request is detected. At step 502, the browser 302 reads and executes the tracker tag in the downloaded web page while the web page is being formed on the client display device.

As shown by example below, the tracker tag is configured so that each time it is executed by a Javascript enabled browser 302, it appears as an <IMG> tag referring to a file having a URL with an arbitrary number as an extension. The arbitrary number, for example, may be the number of seconds between Jan. 1, 1990 and the time that the tracker tag is executed by the browser. Accordingly, when the <IMG> tag is read by the browser, it first searches the cache memory of the client computer 200 for a file having the selected URL. This file will not be located in the local cache, however, because the browser 302 can only retrieve files having the exact URL of that requested by the <IMG> tag. The arbitrary number therefore prevents such file from being located.

When the file having the selected URL is not located in the local cache, the client computer 200 transmits a tracker message to the tracker 310 on the tracking computer 308 (step 504). The details of the tracker tag and its interaction with the browser 302 and the HTML code in the web page are discussed below. The received tracker message causes the tracker 310 to execute and record the time of the web page access in a database (step 506).

The process then continues to step 508 where a banner image is uploaded from the tracker 310 to the client computer 200 and added to the information in the downloaded and cached web page. The banner image may be a graphic image file (i.e., represented by the extension "gif") representing any indicia, such as the company logo of the software company that manages the tracking computer 308. Alternatively, the banner image may be a transparent one pixel image. The banner image nevertheless provides the response that the browser 302 should receive when the <IMG> tag is read and executed.

At step 510, it is ascertained if the web browser 302 is still on. If it still is on, the process loops back to step 500. The process ends if the browser 302 is off.

This first implementation records the time of each web page access. The client information database therefore may be a relational database having the fields "total number of accesses" and "time of accesses." Other information may be obtained by conventional means, such as the type of browser 302 accessing the web page, the type of computer accessing the web page, and the time between accesses of the web page.

As noted above, the tracker tag preferably includes Javascript code that is embedded in the HTML code of the web page. Below is an exemplary Javascript tracker tag code fragment that may be used for the first implementation.

<script><!--Hide from old browsers
    date=new Date( );
    document.writeln ("<img src=\"http://speedracer.taligent.com/cgi-bin/track?__type=1"
    -"&__s="- date.getTime( )+"\">");
    // Stop hiding --><img src="speedracer.taligent.com/cgi-bin/track?__type=1">
    <script>

To Javascript enabled browsers (e.g., Netscape Navigator™ 2.0, 3.0, or Microsoft Internet Explorer™ 3.0), the above Javascript code appears to the browser 302 as the following HTML code fragment:

<img src="http://speedracer.taligent.com/cgi-bin/track?__type=1&__s=123456789"> where 123456789 is a random number that is unique each time the IMG tag calls the tracker 310. Accordingly, the random number is added to the URL of the file called by the <IMG> tag. As previously noted, the browser 302 cannot locate such file in the cache of the client computer. Consequently, the browser 302 directs a tracker message to the tracker 310 (on the server "speedracer.taligent.com), which, in turn, causes the tracker 310 to record the time of the web page access.

Non-Javascript enabled browsers read the above tracker tag as:

<img src="speedracer.taligent.com/cgi-bin/track?__type=1>

This HTML code similarly sends a tracker message to the tracker 310 when the tracker tag is read and executed. The tracker 310 responsively records the web page access. In addition, the tracker 310 returns the banner image with a header having instructions to not store the banner image in the local cache. The header may be as follows:

Content-type: image/gif
    Content-length: 1234
    Pragma: no-cache
    Cache-control: no-cache
    expires: now
    <returned GIF image of length 1234>

Figure 6:
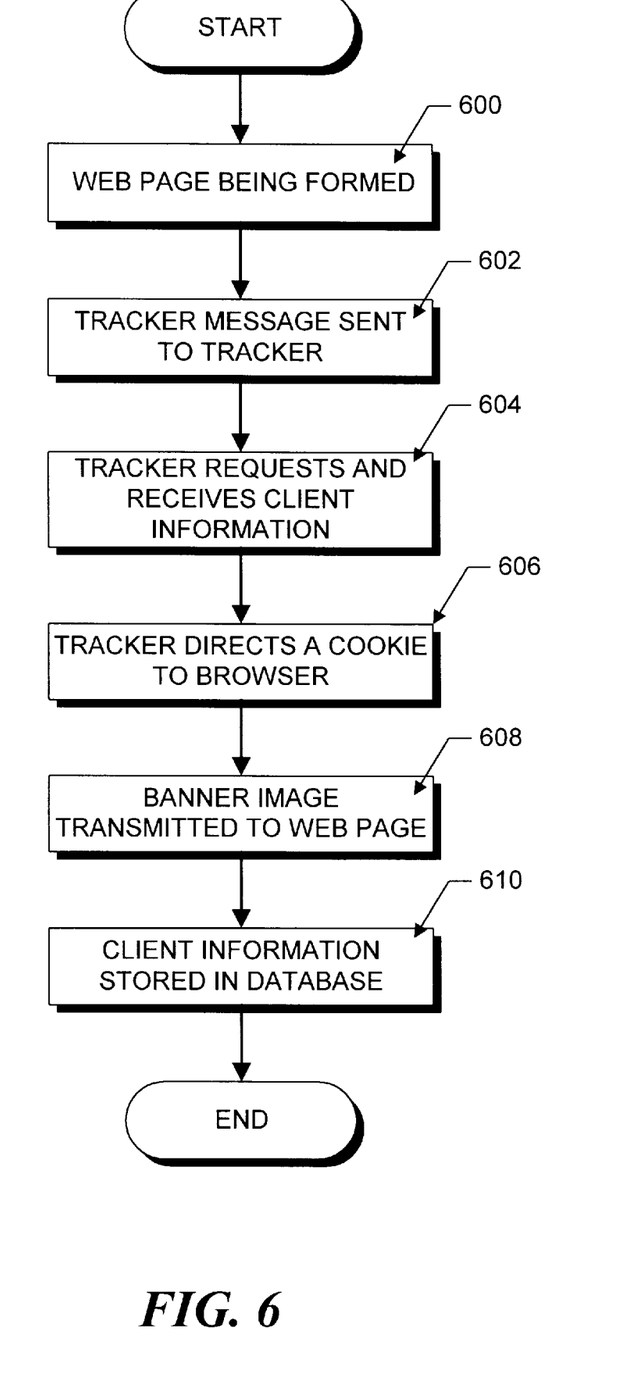
FIG. 6 is a flow chart summarizing the steps that may be used by most currently existing browsers for obtaining client information.

FIG. 6 shows a second implementation that may be used for obtaining the client information. When used with this implementation, the tracker 310 uses cookies and common gateway interface (CGI) scripts to obtain the client information. An exemplary tracking tag may be as follows:

<img src="http://tracker.com/track?__type=1>

The second implementation begins at step 600 in which the web page is being formed for display by the browser 302 on the client computer 200. The web page may be formed in response to either a direct access, or by the selection of the BACK or FORWARD buttons in the browser 302. At step 602, the browser 302 then reads and executes the tracker tag, which causes a tracker message to be directed from the browser 302 to the tracker 310 on the tracking computer 308. As in the first implementation, the browser 302 cannot locate a file in the cache memory of the client computer 200 having the URL following the <IMG> tag, thereby causing the tracker message to be directed from the browser 302 to the tracker 310. This tracker message invokes the tracker 310, which responsively requests and receives the client information (step 604). The information may be obtained from information in the message header of the tracker message, which includes information relating to the browser 302 and client computer 200. In addition, the tracker 310 receives the last cookie, if any, that the web page received from the tracker 310. The cookie may include a unique identification number identifying the client computer 200 and/or the last web page in the web site 306 that was visited by such browser 302. From this information, a web site administrator may determine the number of accesses by a particular browser 302 on a specified client computer 200, and the last web page accessed by such browser 302.

The tracker 310 then transmits a new cookie to the browser 302 (step 606) having selected information relating to the web browser 302, thereby replacing the cookie, if any, that was previously transmitted from the browser 302 to the tracker 310. The tracker 310 also transmits a banner image (e.g., a graphic image file similar to that used by the first implementation) to the browser 302 at step 608 that is not stored in the local cache memory of the client computer 200. Accordingly, the browser 302 will not locate the banner image in the cache memory the next time the web page is formed by the browser, thereby causing the browser 302 to transmit another tracker message to the tracker 310.

The process then continues to step 610 where the client information is stored in the client information database. It should be noted that the second implementation repeats each time the web page is displayed by the client computer. In addition, the second implementation may be used by each computer accessing the web site 306.

Figure 7:
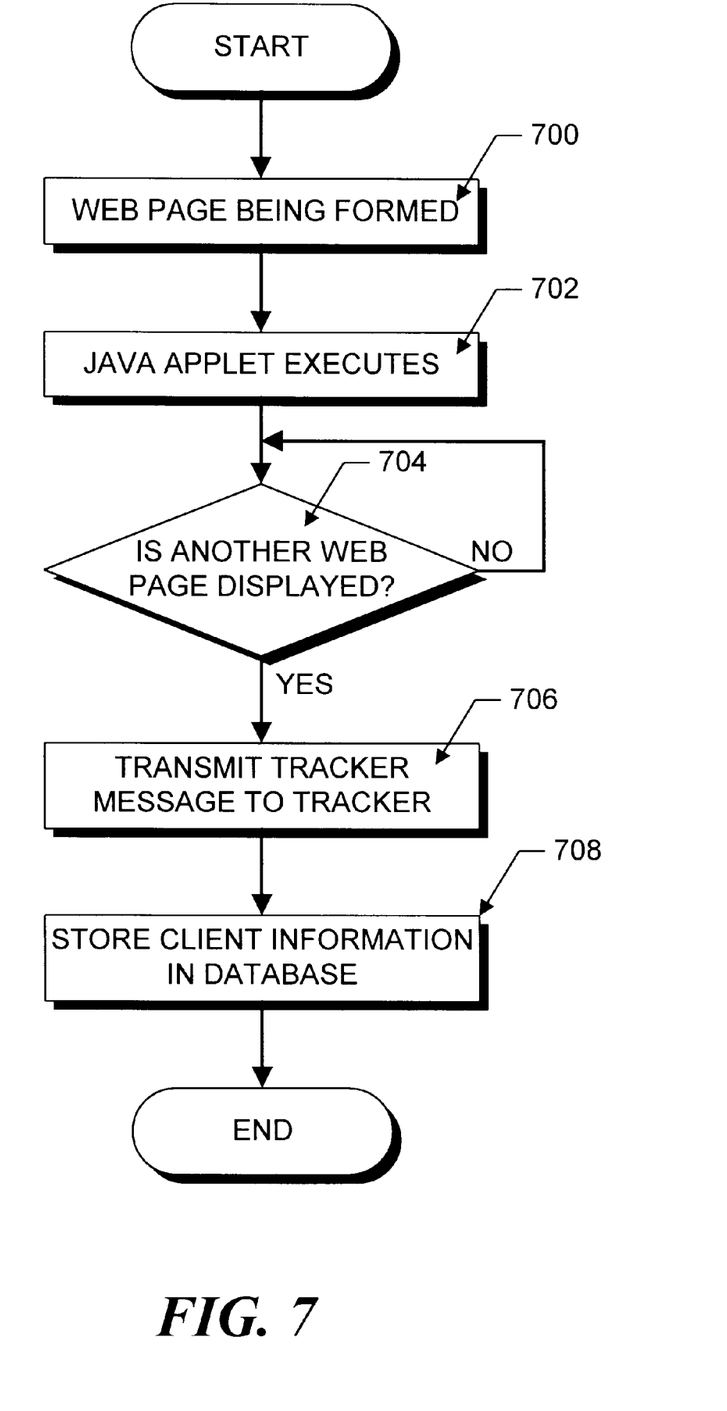
FIG. 7 is a flow chart summarizing the steps that may be used by a Java enabled browser for obtaining client information.

FIG. 7 shows a third implementation in which the tracker tag is a Java applet (applet) and thus, is operable with Java-enabled browsers. The third implementation begins at step 700 where the web page having the applet is formed for display by the client computer 200. This causes the browser 302 to execute the applet on the client computer 200, thereby gathering the client information. Among other functions, the applet preferably calculates the time that the web page is displayed by the client computer 200. It then is ascertained at step 704 if another web page is being displayed on the client display device. When another web page is displayed, the applet transmits the client information (e.g., the time that the web page was displayed by the client computer 200) to the tracker 310 via a tracker message (step 706). The tracker 310 then stores the client information in the database at step 708. This process repeats each time the web page is displayed on by the client computer 200, whether by direct access, or by the selection of the BACK or FORWARD buttons in the browser 302.

The tracker 310 may be any program that implements the above described processes. In the preferred embodiment, the tracker 310 is a CGI program written in C++.

In an alternative embodiment, the invention may be implemented as a lo computer program product for use with a computer system. Such implementation may include a series of computer instructions fixed either on a tangible medium, such as a computer readable media (e.g., diskette 242, CD-ROM 247, ROM 215, or fixed disk 252 as shown in FIG. 2) or transmittable to a computer system, via a modem or other interface device, such as communications adapter 290 connected to the network 295 over a medium 291. Medium 291 may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network 295 (e.g., the Internet or World Wide Web).

Each of the graphical user interfaces discussed above may be constructed by conventional software programming techniques known in the art. It is preferred that the GUIs be constructed by visual builders, such as OCX™ (available from Microsoft Corp.) or Delphi™ (available from Borland Corp.).

Although various exemplary embodiments of the invention have been disclosed, it will be apparent to those skill in the art that various changes and modifications can be made which will achieve some of the advantages of the invention without departing from the true scope of the invention. These and other obvious modifications are intended to be covered by the appended claims.

Having thus described the invention, what we desire to claim and secure by Letters Patent is:

1. A method operable on a client computer having a memory and a browser program running in the memory, the method obtaining client information relating to usage of a World Wide Web site web page consisting of data and code for displaying the data, which data and code are downloaded into the memory from a web server in response to a browser request, the method comprising the steps of:

A. inserting a tracker tag in the web page code in the web server;

B. operating a tracker program at a World Wide Web site;

C. sending, in response to the detection of the tracker tag in web page code being read by the browser program, a tracker message from the client computer to the tracker program; and     D. causing the tracker program to obtain the client information in response to receipt of the tracker message.

2. The method as defined by claim 1 further comprising the step of:

E. storing the obtained client information in a database located at the tracker program World Wide Web site.

3. The method as defined by claim 1 wherein the tracker message includes client information and step D comprises the step of:

D1. copying the client information from the tracker message into a database.

4. The method as defined by claim 1 wherein step D comprises the steps of:

D2. directing, responsive to the tracker message, a cookie having client information from the client computer to the tracker; and     D3. copying the client information from the cookie into a database.

5. The method as defined by claim 1 further comprising the steps of:

G. intercepting a request generated by the browser to display a web page downloaded into the client computer memory;

H. controlling the client computer, responsive to the intercepted request, to direct a second tracker message to the tracker.

6. The method as defined by claim 1 wherein the client information includes the number of times the web page has been accessed by the client computer.

7. The method as defined by claim 1 further comprising the step of:
   I. directing a cookie identifying the client computer to the browser.

8. The method as defined by claim 1 wherein the web server includes a browser, the tracker program being located on a tracking computer that includes a Java applet and a database for storing the client information, the method further comprising the step of:
   J. controlling the Java applet, via the browser on the web server, to access the database on the tracking computer.

9. The method as defined by claim 1 wherein the tracker tag is a Java applet.

10. The method as defined by claim 9 wherein step C comprises the step of:
    C1. executing the Java applet with the browser when the Java applet is downloaded, to generate the tracker message, the tracker message including the client information.

11. The method as defined by claim 10 wherein step D comprises the step of:
    D4. receiving the tracker message; and
    D5. storing the client information in the tracker message in a database.

12. An apparatus operable on a client computer having a memory and a browser program running in the memory, the apparatus obtaining client information relating to usage of a World Wide Web site web page consisting of data and code for displaying the data, which data and code are downloaded into the memory from a web server in response to a browser request, the apparatus comprising:
    a tracker program at a World Wide Web site;
       a tracker tag in the web page code in the web server, the tracker tag including means for sending, in response to detection of the tracker tag in the web page code when the web page code is read by the browser program, a tracker message from the client computer to the tracker program; and
       means for causing the tracker to obtain the client information in response to the receipt of the tracker message.

13. The apparatus as defined by claim 12 wherein the sending means is responsive to the tracker tag being downloaded into the memory of the client computer.

14. The apparatus as defined by claim 12 further comprising:
    means for storing the obtained client information in a database at the tracker program World Wide Web site.

15. The apparatus as defined by claim 12 wherein the tracker message includes client information, the means for causing comprising:
    means for copying the client information from the tracker message into a database.

16. The apparatus as defined by claim 12 wherein the means for causing comprises:
    means for directing, responsive to the tracker message, a cookie having client information from the client computer to the tracker; and
    means for copying the client information from the cookie into a database.

17. The apparatus as defined by claim 12 further comprising:
    means for intercepting a request generated by the browser to display the web page;
    means for controlling the client computer, responsive to the intercepted request, to direct a second tracker message to the tracker.

18. The apparatus as defined by claim 12 wherein the client information includes the number of times the web page has been accessed by the client computer.

19. The apparatus as defined by claim 12 further comprising:
    means for directing a cookie identifying the client computer to the browser.

20. The apparatus as defined by claim 12 wherein the web server includes a browser, the tracker program being located on a tracking computer that includes a Java applet and a database for storing the client information, the apparatus further comprising:
    means for controlling the Java applet, via the browser on the web server, to access the database on the tracking computer.

21. The apparatus as defined by claim 12 wherein the tracker tag is a Java applet.

22. The apparatus as defined by claim 21 wherein the sending means comprises:
    means for executing the Java applet with the browser when the Java applet is downloaded, to generate the tracker message, the tracker message including the client information.

23. The apparatus as defined by claim 22 wherein the causing means comprises:
    means for receiving the tracker message; and
    means for storing the client information in the tracker message in a database.

24. A computer program product comprising:
    a computer usable medium having computer readable program code thereon operable on a client computer having a memory and a browser program running in the memory, the computer program product obtaining client information relating to usage of a World Wide Web site web page consisting of data and code for displaying the data, which data and code are downloaded into the memory from a web server in response to a browser request, the computer readable program code comprising:
        tracker tag program code in the code of the web page;
        program code for operating a tracker program at a World Wide Web site;
        program code for sending, in response to the detection of the tracker tag program code in web page code read by the browser program, a tracker message from the client computer to the tracker program; and
        program code for causing the tracker program to obtain the client information in response to receipt of the tracker message.

25. The computer program product as defined by claim 24 further comprising:
    program code for storing the obtained client information in a database.

26. The computer program product as defined by claim 24 wherein the tracker message includes client information, the program code for causing comprising:
    program code for copying the client information from the tracker message into a database.

27. The computer program product as defined by claim 24 wherein the program code for causing comprises:
   program code for directing, responsive to the tracker message, a cookie having client information from the client computer to the tracker; and
   program code for copying the client information from the cookie into a database.

28. The computer program product as defined by claim 24 further comprising:
   program code for intercepting a request generated by the browser to display a web page downloaded in the memory of the client computer;
   program code for controlling the client computer, responsive to the intercepted request, to direct a second tracker message to the tracker.

29. The computer program product as defined by claim 24 wherein the client information includes the number of times the web page has been accessed by the client computer.

30. The computer program product as defined by claim 24 further comprising:
   program code for directing a cookie identifying the client computer to the browser.

31. The computer program product as defined by claim 24 wherein the web server includes a browser, the tracker program being located on a tracking computer that includes a Java applet and a database for storing the client information, the computer program product further comprising:
   program code for controlling the Java applet, via the browser on the web server, to access the database on the tracking computer.

32. The computer program product as defined by claim 24 wherein the tracker tag is a Java applet.

33. The computer program product as defined by claim 32 wherein the program code for sending comprises:
   program code for executing the Java applet when the Java applet is downloaded, to generate the tracker message, the tracker message including the client information.

34. The computer program product as defined by claim 33 wherein the program code for causing comprises:
   program code for receiving the tracker message; and
   program code for storing the client information in the tracker message in a database.

35. A method operable on a client computer having a memory and a browser program running in the memory, the method obtaining client information relating to usage of a web page consisting of data and code for displaying the data, which data and code are downloaded into the memory from a web server in response to a browser request, the code having tags, each of which includes the address of a tracking server and a location of a resource at the tracking server which is to be retrieved by the browser program, the method comprising the steps of:
   A. inserting a tracker tag in the web page code in the web server, wherein the tracker tag includes a mechanism for modifying the resource location in the tracker tag so that the modified location will be different each time the tracker tag is detected by the browser program;
   B. operating a tracker program at the tracking server;
   C. sending, in response to each detection of the tracker tag in web page code being read by the browser program, a tracker message from the client computer to the tracker program to retrieve a resource at the modified location; and
   D. causing the tracker program to obtain the client information in response to receipt of the tracker message.

36. An apparatus operable on a client computer having a memory and a browser program running in the memory, the apparatus obtaining client information relating to usage of a web page consisting of data and code for displaying the data, which data and code are downloaded into the memory from a web server in response to a browser request, the code having tags, each of which includes the address of a tracking server and a location of a resource at the tracking server which is to be retrieved by the browser program, the apparatus comprising:
   a tracker program at the tracking server;
   a tracker tag in the web page code in the web server, the tracker tag including a mechanism for modifying the resource location in the tracker tag so that the modified location will be different each time the tracker tag is detected by the browser program and means for sending, in response to each detection of the tracker tag in the web page code when the web page code is read by the browser program, a tracker message from the client computer to the tracker program to retrieve a resource at the modified location; and
   means for causing the tracker to obtain the client information in response to the receipt of the tracker message.

37. A computer program product comprising:
   a computer usable medium having computer readable program code thereon operable on a client computer having a memory and a browser program running in the memory, the computer program product obtaining client information relating to usage of a web page consisting of data and code for displaying the data, which data and code are downloaded into the memory from a web server in response to a browser request, the code having tags, each of which includes the address of a tracking server and a location of a resource at the tracking server which is to be retrieved by the browser program, the computer readable program code comprising:
   tracker tag program code in the code of the web page, wherein the tracker tag program code includes program code for modifying the resource location in the tracker tag so that the modified location will be different each time the tracker tag is detected by the browser program;
   program code for operating a tracker program at the tracking server;
   program code for sending, in response to the detection of the tracker tag program code in web page code read by the browser program, a tracker message from the client computer to the tracker program to retrieve a resource at the modified location; and
   program code for causing the tracker program to obtain the client information in response to receipt of the tracker message.

38. A computer data signal embodied in a carrier wave for obtaining client information relating to usage of a World Wide Web site web page consisting of data and code for displaying the data, which data and code are downloaded into the memory from a web server in response to a browser request, the computer data signal comprising:
   program code for inserting a tracker tag into the code of the web page;
   program code for installing a tracker program at a tracking server, the tracker program obtaining the client information in response to receipt of a tracker message; and program code for sending, in response to the detection of the tracker tag program code in web page code when read by the browser program, a tracker message from the client computer to the tracker program so that the tracker program monitors the web page usage.

39. The computer data signal as defined by claim 38 further comprising program code for storing the obtained client information in a database.

40. The computer data signal as defined by claim 38 wherein the tracker message includes client information, and wherein the tracker program comprises program code for copying the client information from the tracker message into a database.

41. The computer data signal as defined by claim 38 wherein the tracker program code comprises:

program code for directing, responsive to the tracker message, a cookie having client information from the client computer to the tracker program; and program code for copying the client information from the cookie into a database.

42. The computer data signal as defined by claim 38 further comprising:

program code for intercepting a request generated by the browser to display a web page downloaded in the memory of the client computer; and program code for controlling the client computer, responsive to the intercepted request, to direct a second tracker message to the tracker program.

43. The computer data signal as defined by claim 38 wherein the client information includes the number of times the web page has been accessed by the client computer.

44. The computer data signal as defined by claim 38 wherein the program code for sending a tracker message comprises program code for directing a cookie identifying the client computer to the tracker program.

45. The computer data signal as defined by claim 38 wherein the web server includes a browser and the tracker program includes a Java applet and a database for storing the client information, the computer data signal further comprising program code for controlling the Java applet, via the browser on the web server, to access the database on the tracking server.

46. The computer data signal as defined by claim 38 wherein the tracker tag is a Java applet.

47. The computer data signal as defined by claim 46 wherein the program code for sending a tracker message comprises program code for executing the Java applet when the Java applet is downloaded, to generate the tracker message, the tracker message including the client information.

48. The computer data signal as defined by claim 47 wherein the tracker program code comprises:

program code for receiving the tracker message; and program code for storing the client information in the tracker message in a database.

* * * * *